United States Patent
Liu

(10) Patent No.: US 11,864,190 B2
(45) Date of Patent: Jan. 2, 2024

(54) METHOD AND APPARATUS FOR CONFIGURING AND DETERMINING TRANSMISSION BLOCK SCHEDULING INTERVAL, AND BASE STATION

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 435 days.

(21) Appl. No.: 17/266,593

(22) PCT Filed: Aug. 7, 2018

(86) PCT No.: PCT/CN2018/099225
§ 371 (c)(1),
(2) Date: Feb. 6, 2021

(87) PCT Pub. No.: WO2020/029085
PCT Pub. Date: Feb. 13, 2020

(65) Prior Publication Data
US 2021/0314996 A1    Oct. 7, 2021

(51) Int. Cl.
*H04W 72/23* (2023.01)
*H04W 4/70* (2018.01)
(Continued)

(52) U.S. Cl.
CPC ........... *H04W 72/23* (2023.01); *H04L 5/0058* (2013.01); *H04L 5/0078* (2013.01); *H04W 4/70* (2018.02);
(Continued)

(58) Field of Classification Search
CPC ....... H04W 72/23; H04W 4/70; H04W 72/51; H04W 72/1263; H04L 5/0058; H04L 5/0078
(Continued)

(56) References Cited

U.S. PATENT DOCUMENTS 9,326,290 B2    4/2016    Zhu
2020/0044768 A1*    2/2020    Yoshimura ............ H04L 1/1835

FOREIGN PATENT DOCUMENTS

CN    101272388 A    9/2008
CN    101400072 A    4/2009
(Continued)

OTHER PUBLICATIONS

State Intellectual Property Office of the People's Republic of China, Office Action and Search Report Issued in Application No. 201880001640.0, dated Aug. 3, 2021, 22 pages.
(Continued)

*Primary Examiner* — Christopher R Crompton
(74) *Attorney, Agent, or Firm* — Arch & Lake LLP

(57) ABSTRACT

The present disclosure relates to methods and apparatuses for configuring a transport block scheduling interval, methods and apparatuses for determining a transport block scheduling interval, base stations, user equipment, and computer-readable storage media. A method of configuring a transport block scheduling interval includes: if scheduling of current machine type communication (MTC) user equipment (UE) is in a preset type, determining a corresponding transport block scheduling interval based on current capability information of the current MTC UE, and sending scheduling information to the current MTC UE through a physical downlink control channel (PDCCH). The current capability information includes a parameter indicating a scheduling processing capability level of the current MTC UE. The
(Continued)

scheduling information includes the corresponding transport block scheduling interval.

9 Claims, 7 Drawing Sheets

(51) Int. Cl.
*H04L 5/00* (2006.01)
*H04W 72/1263* (2023.01)
*H04W 72/51* (2023.01)

(52) U.S. Cl.
CPC ....... *H04W 72/1263* (2013.01); *H04W 72/51* (2023.01)

(58) Field of Classification Search
USPC .......................................................... 370/329
See application file for complete search history.

(56) References Cited

FOREIGN PATENT DOCUMENTS

| | | | |
|---|---|---|---|
| CN | 103248598 | A | 8/2013 |
| CN | 107155181 | A | 9/2017 |
| CN | 107371265 | A | 11/2017 |
| CN | 107484251 | A | 12/2017 |
| CN | 109075961 | A | 12/2018 |
| WO | 2014023024 | A1 | 2/2014 |
| WO | 2017171398 | A1 | 10/2017 |
| WO | WO 2017171398 | * 10/2017 | ............... H04B 7/26 |
| WO | 2018009037 | A1 | 1/2018 |
| WO | WO 2018009037 | * 1/2018 | ............... H04L 5/00 |
| WO | 2018119756 | A1 | 7/2018 |

OTHER PUBLICATIONS

European Patent Office, Extended European Search Report Issued in Application No. 18929216.2, dated Aug. 5, 2021, Germany, 12 pages.

ISA State Intellectual Property Office of the People's Republic of China, Written Opinion of the International Searching Authority Issued in Application No. PCT/CN2018/099225, dated Apr. 16, 2019, WIPO, 9 pages.

"3rd Generation Partnership Project; Technical Specification Group Radio Access Network; NR; NR and NG-RAN Overall Description; Stage 2 (Release 15)", 3GPP TS 38.300, 3GPP, France, Jun. 20, 2018, 87 pages.

Ericsson, Huawei, "New WID on Rel-16 enhancements for NB-IoT", 3GPP TSG RAN Meeting #80, La Jolla, USA, RP-181451, Jun. 11-14, 2018, 4 pages.

International Search Report of PCT Application No. PCT/CN2018/099225 dated Apr. 16, 2019 with English translation (4p).

INOA, Hearing Notice in Reference of Application No. 202147008556, dated Jul. 18, 2022 with English translation, (2p).

Intellectual property India, Office Action Issued in Application No. 202147008556, dated Jan. 20, 2022, (7 pages). (Submitted with Partial Machine Translation).

* cited by examiner

METHOD AND APPARATUS FOR CONFIGURING AND DETERMINING TRANSMISSION BLOCK SCHEDULING INTERVAL, AND BASE STATION

CROSS-REFERENCE TO RELATED APPLICATION

This application is the national phase of International Application No. PCT/CN2018/099225, filed on Aug. 7, 2018, the disclosure of which is incorporated herein by reference in its entirety.

TECHNICAL FIELD

The present disclosure relates to the field of communication technologies, and in particular, relates to methods and apparatuses for cSubsonfiguring a transport block scheduling interval, and methods and apparatuses for determining a transport block scheduling interval, base stations, user equipment and computer-readable storage media.

BACKGROUND

During a discussion on enhanced Machine Type Communication (MTC) in the 3rd Generation Partnership Project (3GPP), a singly-scheduling and multiply-transmitting way is submitted for scheduling data of CAT-M1 (Category M1) user equipment (UE), which, for descriptive purposes, is called a single-to-multiple transport block (TB) scheduling. This scheduling way, on one hand, is no longer limited by a bandwidth or a corresponding TB size, so that more data can be scheduled; and on the other hand, it can reduce the overhead of a control channel and improve the utilization of radio interface.

However, different CAT-M1 UE have different data processing capabilities. Therefore, when the single-to-multiple scheduling is introduced, the UE with smaller buffer may be affected if the interval between two data transmissions is too small, so that it is unfair to rigidly specify a small transmission interval at physical layer. Meanwhile, it cannot take full advantage of the UE with larger buffer if a larger transmission interval is specified.

MTC UE are obviously distinguished from mobile UE because the MTC UE are applicable to widely different situations. For example, some MTC UE are only to transmit a little data, while the others are on the contrary. Thus, how to set transport block scheduling intervals for various UE is a technical problem that is expected to be solved.

SUMMARY

In view of the above, the present disclosure discloses methods and apparatuses for configuring a transport block scheduling interval, methods and apparatuses for determining a transport block scheduling interval, base stations, UE, and computer-readable storage media.

According to a first aspect of the present disclosure, a method of configuring a transport block scheduling interval, being applicable to a base station, is provided, and the method includes: in response to that scheduling of current MTC UE is in a preset type, determining a corresponding transport block scheduling interval based on current capability information of the current MTC UE, where the current capability information includes a parameter indicating a scheduling processing capability level of the current MTC UE; and sending scheduling information to the current MTC UE through a physical downlink control channel (PDCCH), where the scheduling information includes the corresponding transport block scheduling interval.

According to a second aspect of the present disclosure, a method of determining a transport block scheduling interval, being applicable to MTC UE, is provided, and the method includes: receiving scheduling information from a base station through a PDCCH, where the scheduling information includes a transport block scheduling interval corresponding to the MTC UE; parsing out the transport block scheduling interval from the scheduling information; and receiving data from scheduled physical downlink shared channels (PDSCHs) of the PDCCH in accordance with the transport block scheduling interval.

According to a third aspect of the present disclosure, a base station is provided, and the base station includes: a processor; and a memory for storing instructions executable by the processor; where the processor is configured to: in response to that scheduling of current MTC UE is in a preset type, determine a corresponding transport block scheduling interval based on current capability information of the current MTC UE, where the current capability information includes a parameter indicating a scheduling processing capability level of the current MTC UE; and send scheduling information to the current MTC UE through a PDCCH, where the scheduling information includes the corresponding transport block scheduling interval.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
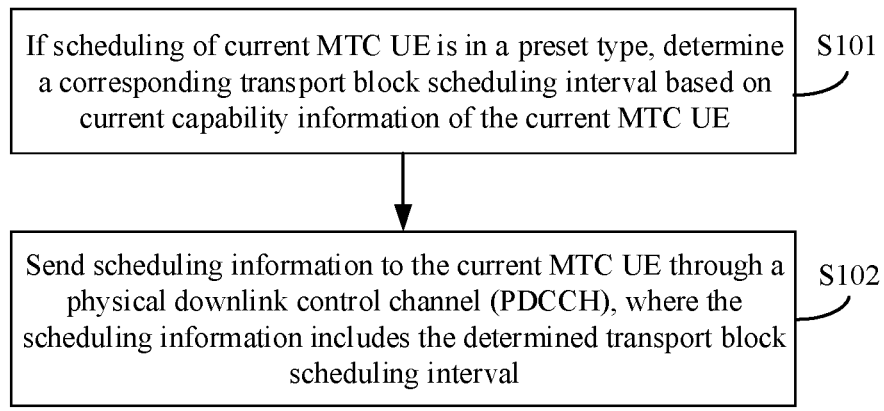
FIG. 1 is a flowchart illustrating a method of configuring a transport block scheduling interval according to an example of the present disclosure.

The present disclosure will be described in detail here with the examples thereof expressed in the drawings. Where the following descriptions involve the drawings, like numerals in different drawings refer to like or similar elements unless otherwise indicated. The implementations described in the following examples do not represent all examples consistent with the present disclosure. Rather, they are merely examples of apparatuses and methods consistent with some aspects of the present disclosure as detailed in the appended claims.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

FIG. 1 is a flowchart illustrating a method of configuring a transport block scheduling interval according to an example of the present disclosure, which is described from a base station side. As shown in FIG. 1, the method of configuring a transport block scheduling interval includes the following steps.

At step S101, if scheduling of current MTC UE is in a preset type, a corresponding transport block scheduling interval is determined based on current capability information of the current MTC UE. The current capability information includes a parameter indicating a distinctive scheduling processing capability level of the current MTC UE.

In some examples, the scheduling in the preset type refers to that TB scheduling information of a plurality of PDSCHs is carried by one PDCCH, shortened to a single-to-multiple TB scheduling.

In the example, that the corresponding transport block scheduling interval is determined based on current capability information of the current MTC UE includes: determining a first time interval as the corresponding transport block scheduling interval if the current capability information indicates that the scheduling processing capability level of the current MTC UE is a first level, and determining a second time interval as the corresponding transport block scheduling interval if the current capability information indicates that the scheduling processing capability level of the current MTC UE is a second level. In some examples, the first level is lower than the second level and the first time interval is greater than the second time interval. That is, the TB scheduling interval configured for the MTC UE with a low capacity is larger, while the TB scheduling interval configured for the MTC UE with a high capacity is smaller.

At step S102, scheduling information is sent to the current MTC UE through a PDCCH, where the scheduling information includes the determined corresponding transport block scheduling interval.

According to the above example, by determining a corresponding transport block scheduling interval based on current capability information of current MTC UE when scheduling the current MTC UE is in a preset type, and sending scheduling information that includes the determined corresponding transport block scheduling interval to the current MTC UE through a PDCCH, configuring the TB scheduling interval flexibly can be effectively realized, and thereby to support a single-to-multiple TB scheduling for the MTC UE.

Figure 2:
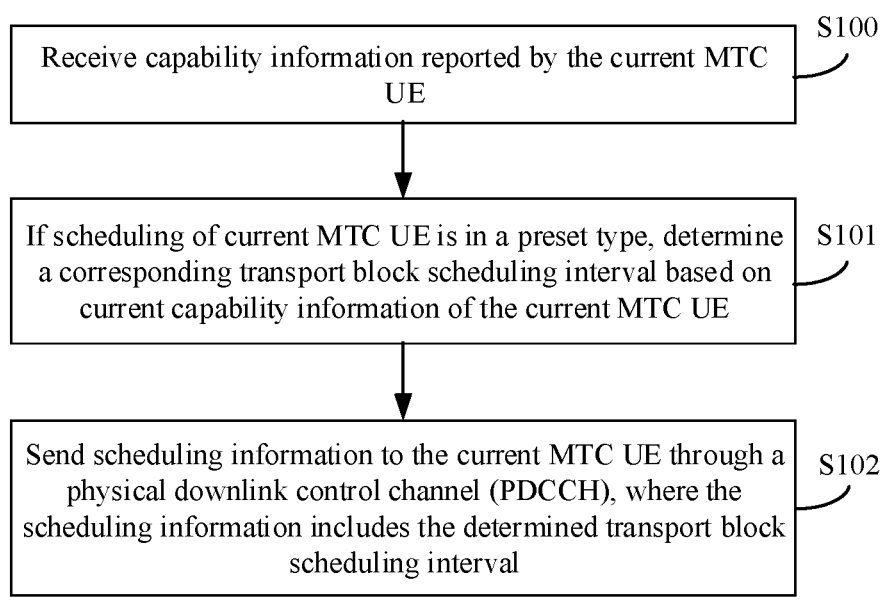
FIG. 2 is a flowchart illustrating another method of configuring a transport block scheduling interval according to an example of the present disclosure.

FIG. 2 is a flowchart illustrating another method of configuring a transport block scheduling interval according to an example of the present disclosure. As shown in FIG. 2, before step S101, the method may further include the following step.

At step S100, capability information reported by the current MTC UE is received.

For instance, in some examples, after the capability information reported by the current MTC UE is received, it may also to receive updated capability information reported by the current MTC UE.

According to the above example, by receiving capability information reported by current MTC UE, it provides basis for subsequently determining a corresponding transport scheduling interval based on current capability information of the current MTC UE.

Figure 3:
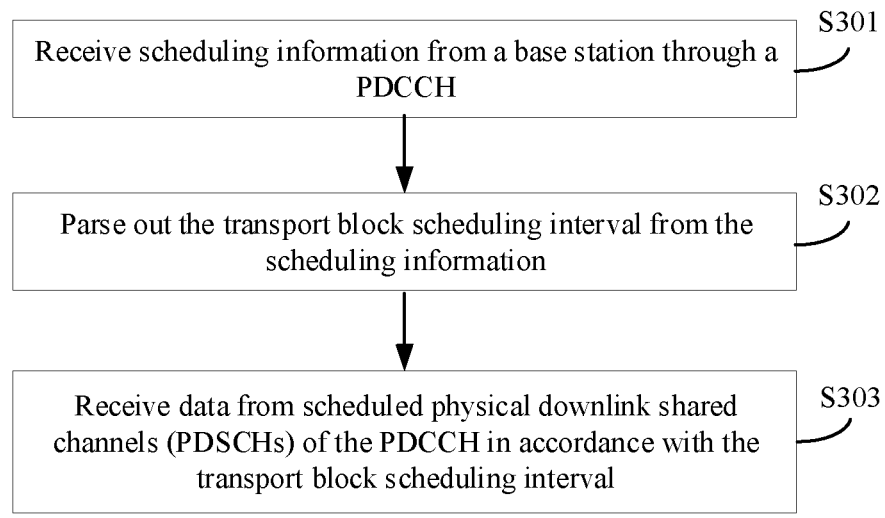
FIG. 3 is a flowchart illustrating a method of determining a transport block scheduling interval according to an example of the present disclosure.

FIG. 3 is a flowchart illustrating a method of determining a transport block scheduling interval according to an example of the present disclosure, which is described from an MTC UE side. As shown in FIG. 3, the method includes the following steps.

At step S301, scheduling information is received from a base station through a PDCCH. The scheduling information includes a transport block scheduling interval corresponding to current MTC UE.

At step S302, the transport block scheduling interval is parsed out from the scheduling information.

At step S303, data is received from scheduled PDSCHs of the PDCCH in accordance with the transport block scheduling interval.

According to the above example, by receiving scheduling information from a base station through a PDCCH, parsing out a transport block scheduling interval from the scheduling information, and receiving data from scheduled PDSCHs of the PDCCH in accordance with the transport block scheduling interval, flexible configuration of the TB scheduling interval by the base station can be effectively realized and thus enabling a single-to-multiple TB scheduling for the MTC UE.

Figure 4:
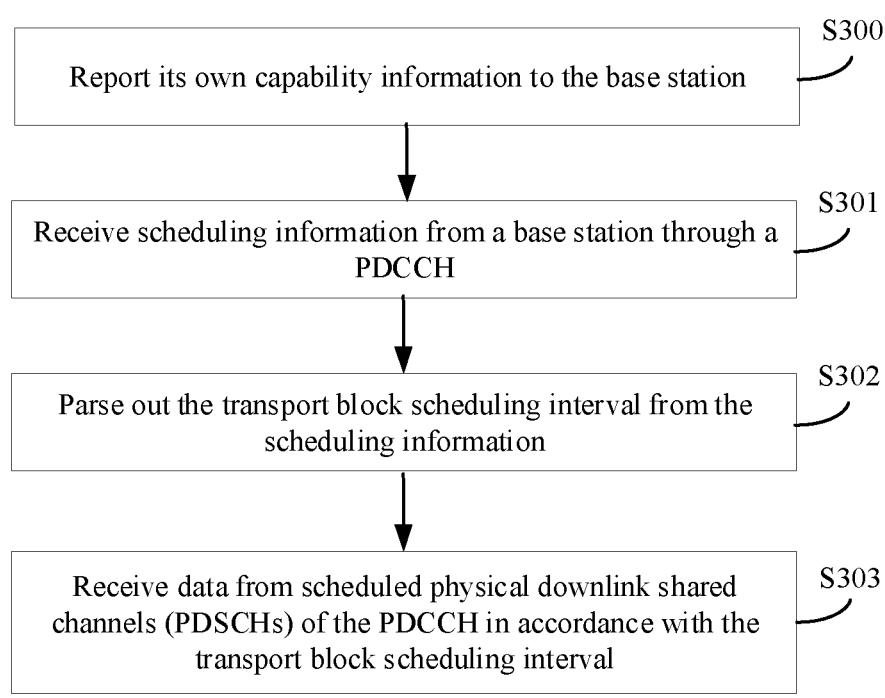
FIG. 4 is a flowchart illustrating another method of determining a transport block scheduling interval according to an example of the present disclosure.

FIG. 4 is a flowchart illustrating another method of determining a transport block scheduling interval according to an example of the present disclosure. As shown in FIG. 4, before step S301, the method may further include the following step.

At step S300, its own capability information is reported to the base station. The capability information includes a parameter indicating a distinctive scheduling processing capability level of the current MTC UE.

In some examples, after its own capability information is reported to the base station, its own updated capability information may be also reported to the base station so as to adapt to changes in the application scenario of the MTC UE. Thereby, the base station can adjust the transport block scheduling interval of the UE based on the current capability information.

According to the above example, by reporting its own capability information to a base station, the base station can determine a corresponding transport block scheduling interval based on current capability information of current MTC UE.

Figure 5:
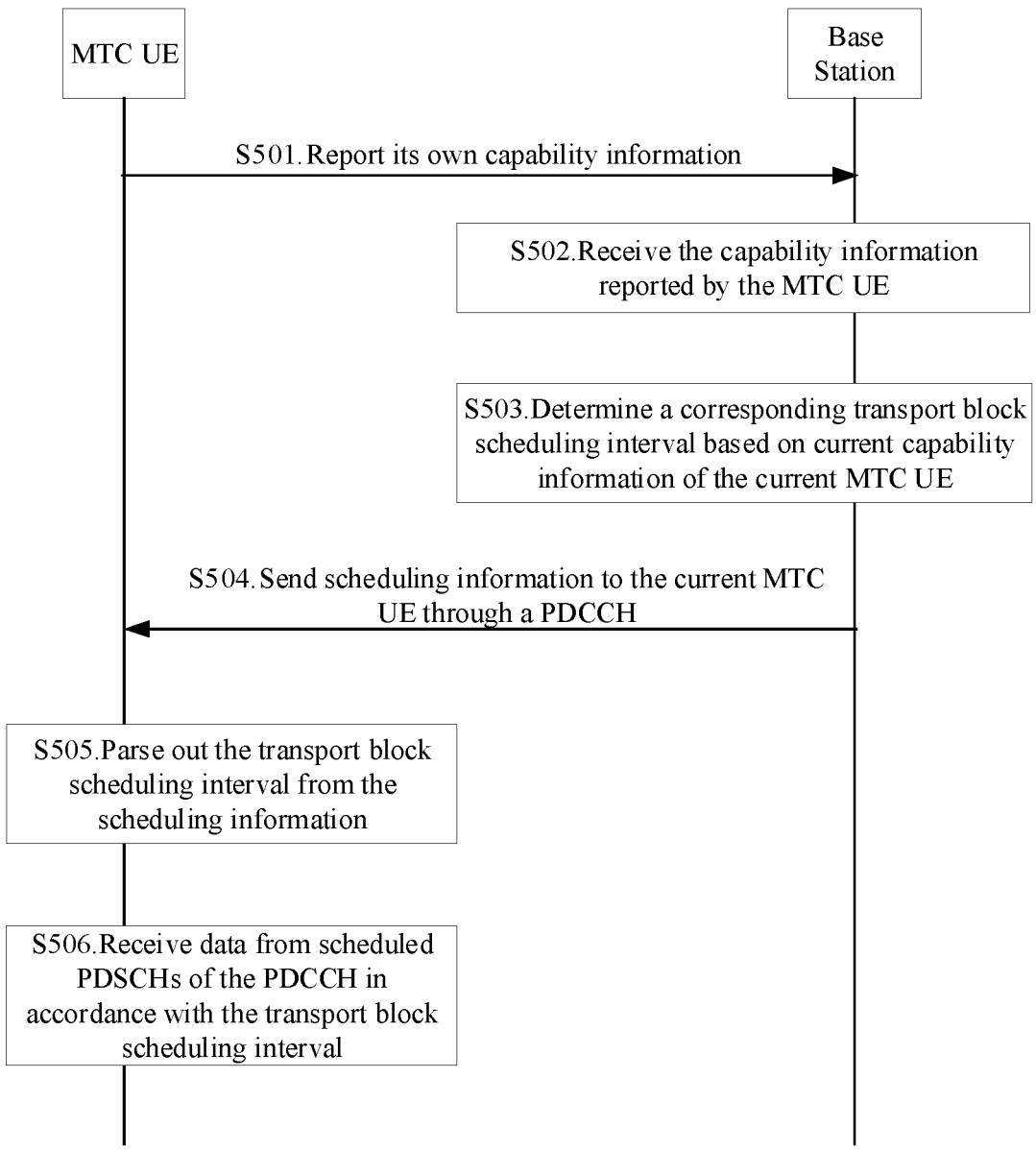
FIG. 5 is a signaling flowchart illustrating a method of determining a transport block scheduling interval according to an example of the present disclosure.

FIG. 5 is a signaling flowchart illustrating a method of determining a transport block scheduling interval according to an example of the present disclosure, which is described from the perspective of interaction between a base station and MTC UE. As shown in FIG. 5, the method includes the following steps.

At step S501, the MTC UE reports its own capability information to the base station. The capability information includes a parameter indicating a distinctive scheduling processing capability level of the current MTC UE.

At step S502, the base station receives the capability information reported by the MTC UE.

At step S503, the base station determine a corresponding transport block scheduling interval based on current capability information of the current MTC UE if scheduling the current MTC UE is in a preset type.

At step S504, the base station sends scheduling information to the current MTC UE through a PDCCH. The scheduling information includes the determined corresponding transport block scheduling interval.

At step S505, the MTC UE parses out the transport block scheduling interval from the scheduling information.

At step S506, the MTC UE receives data from scheduled PDSCHs of the PDCCH in accordance with the transport block scheduling interval.

According to the above example, through the interaction between the MTC UE and the base station, flexible configuration of a TB scheduling interval by the base station can be effectively realized and thus enabling a single-to-multiple TB scheduling for the MTC UE.

Figure 6:
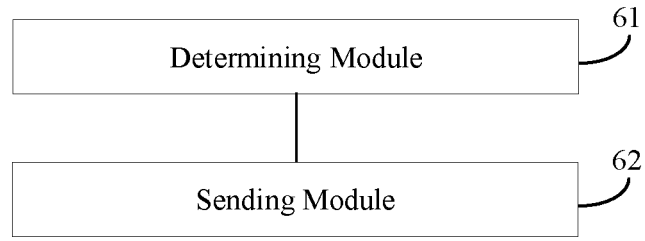
FIG. 6 is a block diagram illustrating an apparatus for configuring a transport block scheduling interval according to an example.

FIG. 6 is a block diagram of an apparatus for configuring a transport block scheduling interval according to an example. The configuring apparatus may be located in a base station. As shown in FIG. 6, the apparatus includes: a determining module 61 and a sending module 62.

The determining module 61 is configured to determine a corresponding transport block scheduling interval based on current capability information of current MTC UE when scheduling the current MTC UE is in a preset type. The current capability information includes a parameter indicating a distinctive scheduling processing capability level of the current MTC UE.

The scheduling in the preset type refers to that TB s scheduling information of a plurality of PDSCHs is carried by one PDCCH, shortened to a single-to-multiple TB scheduling.

The sending module 62 is configured to send scheduling information to the current MTC UE through a PDCCH. The scheduling information includes the transport block scheduling interval determined by the determining module 61.

According to the above example, by determining a corresponding transport block scheduling interval based on current capability information of current MTC UE when scheduling the current MTC UE is in a preset type, and sending scheduling information that includes the determined corresponding transport block scheduling interval to the current MTC UE through a PDCCH, configuring the TB scheduling interval flexibly can be effectively realized, and thereby to support a single-to-multiple TB scheduling for the MTC UE.

Figure 7:
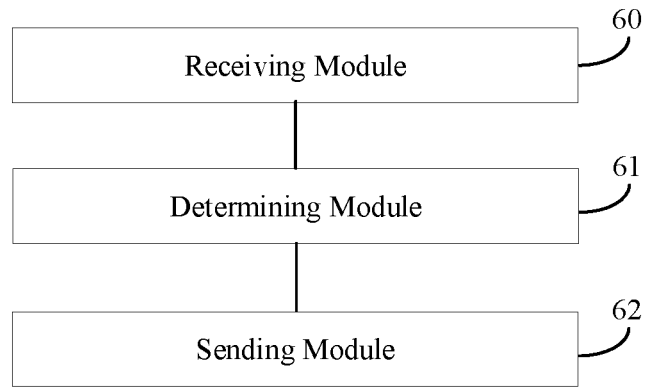
FIG. 7 is a block diagram illustrating another apparatus for configuring a transport block scheduling interval according to an example.

FIG. 7 is a block diagram of another apparatus for configuring a transport block scheduling interval according to an example. As shown in FIG. 7, on the basis of the example shown in FIG. 6, the apparatus may further include: a receiving module 60.

The receiving module 60 is configured to receive capability information reported by the current MTC UE before the determining module 61 determines the corresponding transport block scheduling interval.

In some examples, the receiving module 60 may be further configured to receive updated capability information reported by the current MTC UE after receiving the capability information reported by the current MTC UE.

According to the above example, by receiving capability information reported by current MTC UE, it provides basis for subsequently determining a corresponding transport scheduling interval based on current capability information of the current MTC UE.

Figure 8:
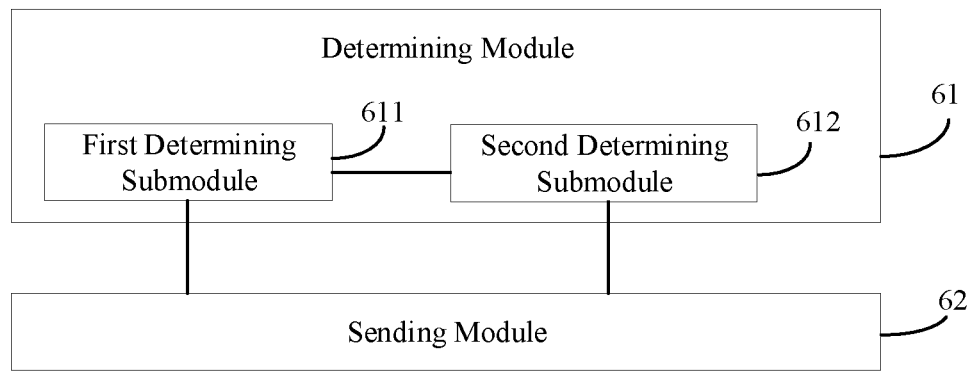
FIG. 8 is a block diagram illustrating another apparatus for configuring a transport block scheduling interval according to an example.

FIG. 8 is a block diagram illustrating another apparatus for configuring a transport block scheduling interval according to an example. As shown in FIG. 8, on the basis of the example shown in FIG. 6, the determining module 61 may include: a first determining submodule 611 and a second determining submodule 612.

The first determining submodule 611 is configured to determine a first time interval as the corresponding transport block scheduling interval when the current capability information indicates that the scheduling processing capability level of the current MTC UE is a first level.

The second determining submodule 612 is configured to determine a second time interval as the corresponding transport block scheduling interval when the current capability information indicates that the scheduling processing capability level of the current MTC UE is a second level. In some examples, the first level is lower than the second level and the first time interval is greater than the second time interval.

According to the above example, by determining a corresponding transport block scheduling interval based on a scheduling processing capability level indicated by current capability information of current MTC UE, it is simple to be implemented.

Figure 9:
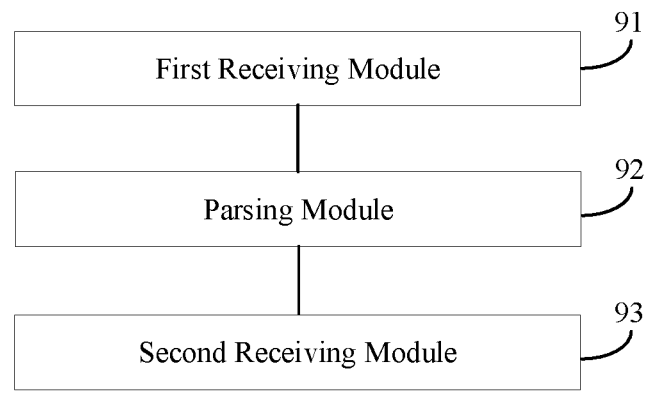
FIG. 9 is a block diagram illustrating an apparatus for determining a transport block scheduling interval according to an example.

FIG. 9 is a block diagram of an apparatus for determining a transport block scheduling interval according to an example. The determining apparatus may be located in MTC UE. As shown in FIG. 9, the apparatus includes: a first receiving module 91, a parsing module 92, and a second receiving module 93.

The first receiving module 91 is configured to receive scheduling information from a base station through a PDCCH. The scheduling information includes a transport block scheduling interval corresponding to current MTC UE.

The parsing module 92 is configured to parse out the transport block scheduling interval from the scheduling information received by the first receiving module 91.

The second receiving module 93 is configured to receive data from scheduled PDSCHs of the PDCCH in accordance with the transport block scheduling interval parsed out by the parsing module 92.

According to the above example, by receiving scheduling information sent by a base station through a PDCCH, parsing out a transport block scheduling interval from the scheduling information, and receiving data from scheduled PDSCHs of the PDCCH in accordance with the transport block scheduling interval, flexible configuration of the TB scheduling interval by the base station can be effectively realized and thus enabling a single-to-multiple TB scheduling for the MTC UE.

Figure 10:
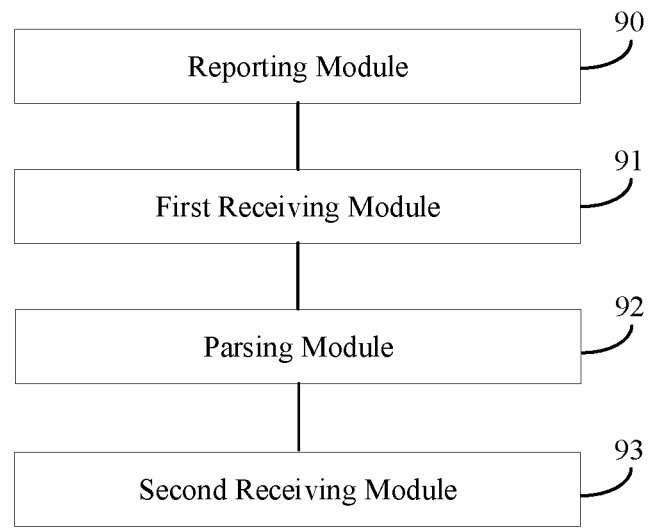
FIG. 10 is a block diagram illustrating another apparatus for determining a transport block scheduling interval according to an example.

FIG. 10 is a block diagram of another apparatus for determining a transport block scheduling interval according to an example. As shown in FIG. 10, on the basis of the example shown in FIG. 9, the apparatus may further include: a reporting module 90.

The reporting module 90 is configured to report its own capability information to the base station before the first receiving module 91 receives the scheduling information. The capability information includes a parameter indicating a distinctive scheduling processing capability level of the current MTC UE.

In some examples, the reporting module 90 may be further configured to report its own updated capability information to the base station after reporting its own capability information to the base station, so as to adapt to changes in the application scenario of the MTC UE. Thereby, the base station can adjust the transport block scheduling interval of the UE based on the current capability information.

According to the above example, by reporting its own capability information to a base station, the base station can determine a corresponding transport block scheduling interval based on current capability information of current MTC UE.

Figure 11:
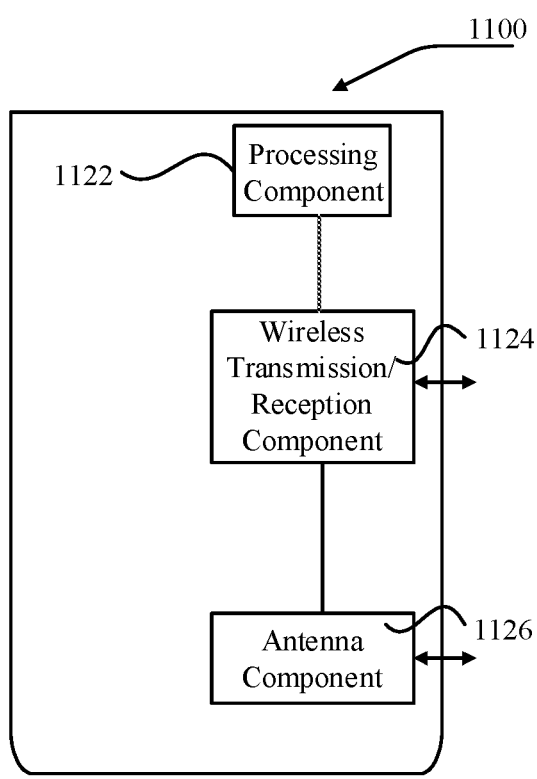
FIG. 11 is a block diagram applicable to a device for configuring a transport block scheduling interval illustrated according to an example.

FIG. 11 is a block diagram applicable to a device for configuring a transport block scheduling interval illustrated according to an example. The device 1100 may be provided as a base station. As shown in FIG. 11, the device 1100 includes a processing component 1122, a wireless transmitting/receiving component 1124, an antenna component 1126, and a signal processing part unique to a wireless interface. The processing component 1122 may further include one or more processors.

One of the processors of the processing component 1122 may be configured to:
in response to that scheduling of current MTC UE is in a preset type, determine a corresponding transport block scheduling interval based on current capability information of the current MTC UE, where the current capability information includes a parameter indicating a distinctive scheduling processing capability level of the current MTC UE; and
send scheduling information to the current MTC UE through a PDCCH, where the scheduling information includes the determined corresponding transport block scheduling interval.

In some examples, a non-transitory computer-readable storage medium including instructions is provided, and the instructions may be executed by the processing component 1122 of the device 1100 to complete the method of configuring a transport block scheduling interval. For example, the non-transitory computer-readable storage medium may be a Read-Only Memory (ROM), a Random Access Memory (RAM), CD-ROM, a magnetic tape, a floppy disk, an optical data storage device, and the like.

Figure 12:
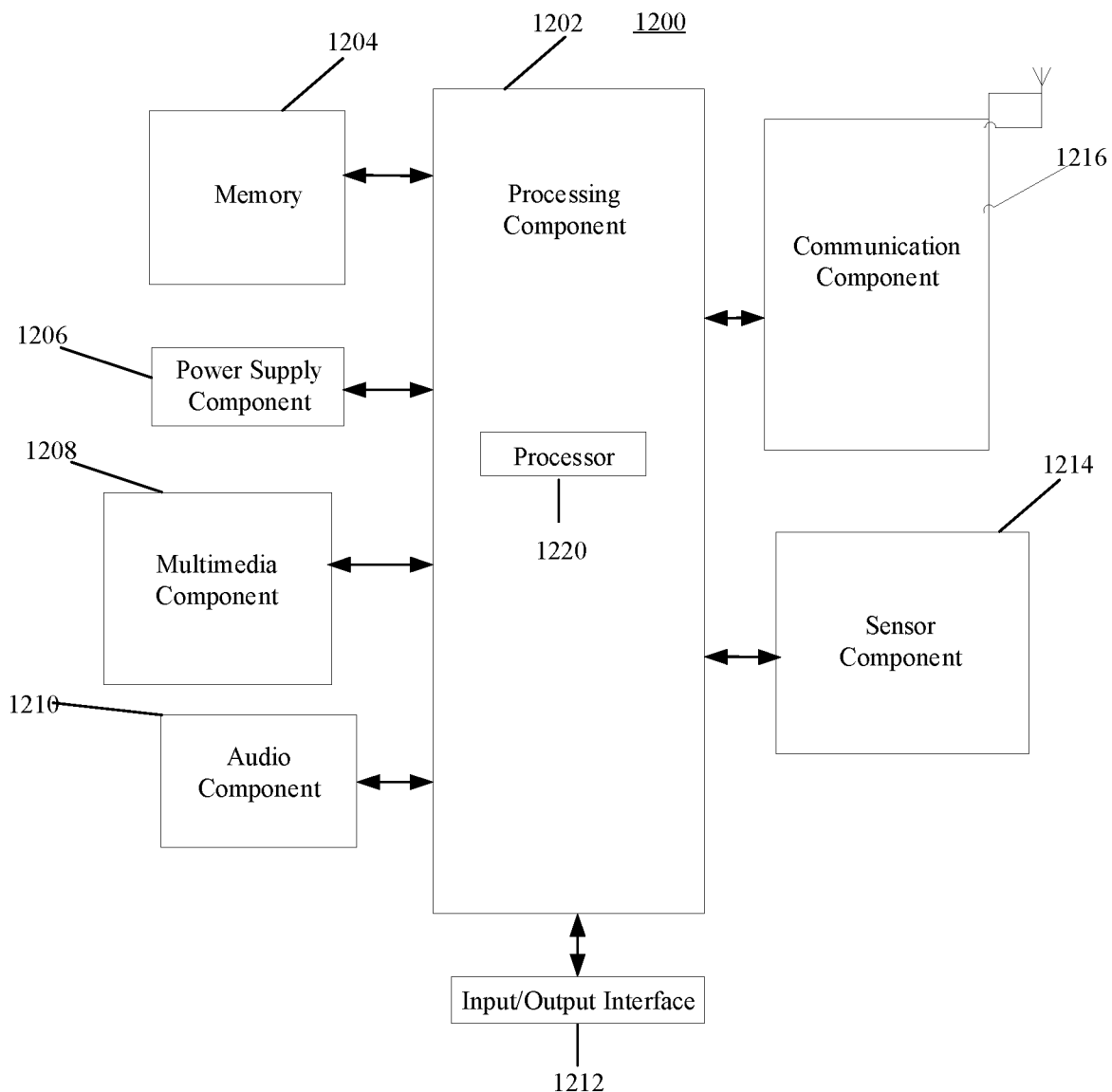
FIG. 12 is a block diagram applicable a device for determining a transport block scheduling interval illustrated according to an example.

FIG. 12 is a block diagram applicable to a device for determining a transport block scheduling interval illustrated according to an example. For example, a device 1200 may be a mobile phone, a computer, a digital broadcast terminal, a message receiving and transmitting device, a game console, a tablet device, a medical device, a fitness device, a personal digital assistant, and other user equipment.

As shown in FIG. 12, the device 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls the overall operation of the device 1200, such as operations associated with display, telephone calls, data communications, camera operations, and recording operations. The processing component 1202 may include one or more processors 1220 to execute instructions to complete all or part of the steps of the above methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

One of the processors 1220 of the processing component 1202 may be configured to:
receive scheduling information from a base station through a PDCCH, where the scheduling information includes a transport block scheduling interval corresponding to current MTC UE;
parse out the transport block scheduling interval from the scheduling information; and
receive data from scheduled PDSCHs of the PDCCH in accordance with the transport block scheduling interval.

The memory 1204 is configured to store various types of data to support the operation of the device 1200. Examples of such data include instructions for any application or method operated on the device 1200, contact data, phonebook data, messages, pictures, videos, and the like. The memory 1204 may be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

The power supply component 1206 supplies power for different components of the device 1200. The power supply component 1206 may include a power supply management system, one or more power supplies, and other components associated with generating, managing and distributing power for the device 1200.

The multimedia component 1208 includes a screen providing an output interface between the device 1200 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1208 may include a front camera and/or a rear camera. The front camera and/or rear camera may receive external multimedia data when the device 1200 is in an operating mode, such as a photographing mode or a video mode. Each front camera and rear camera may be a fixed optical lens system or have focal length and optical zooming capability.

The audio component 1210 is configured to output and/or input an audio signal. For example, audio component 1210 includes a microphone (MIC) that is configured to receive an external audio signal when the device 1200 is in an operational mode, such as a call mode, a recording mode, and a voice recognition mode. The received audio signal may be further stored in the memory 1204 or sent via the communication component 1216. In some examples, the audio component 1210 also includes a speaker for outputting an audio signal.

The I/O interface 1212 provides an interface between the processing component 1202 and a peripheral interface module. The above peripheral interface module may be a keyboard, a click wheel, buttons, or the like. These buttons may include but not limited to, a home button, a volume button, a start button and a lock button.

The sensor component 1214 includes one or more sensors for providing the device 1200 with a status assessment of various aspects. For example, the sensor component 1214 may detect the on/off status of the device 1200, and relative positioning of components, such as a display and a keypad of the device 1200. The sensor component 1214 may also detect a change in position of the device 1200 or a component of the device 1200, the presence or absence of user contact with the device 1200, orientation or acceleration/deceleration of the device 1200, and temperature change of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some examples, the sensor component 1214 may also include an acceleration sensor, a gyro sensor, a magnetic sensor, a pressure sensor, or a temperature sensor.

The communication component 1216 is configured to facilitate wired or wireless communication between the device 1200 and other devices. The device 1200 may access a wireless network based on a communication standard, such as WiFi, 2G or 3G, or a combination thereof. In an example, the communication component 1216 receives a broadcast signal or broadcast-associated information from an external broadcast management system via a broadcast channel. In one example, the communication component 1216 may further include a Near Field Communication (NFC) module for facilitate short-range communication. For example, the NFC module may be implemented based on a radio frequency identification (RFID) technology, an infrared data association (IrDA) technology, an ultra-wideband (UWB) technology, a Bluetooth® (BT) technology and other technologies.

In some examples, the device 1200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-transitory computer-readable storage medium including instructions, such as the memory 1204 including instructions. The above instructions may be executed by the processor 1220 of the device 1200 to complete the above methods. For example, the non-transitory computer-readable storage medium may be a Read-Only Memory (ROM), a Random Access Memory (RAM), CD-ROM, a magnetic tape, a floppy disk, an optical data storage device, and the like.

Since the apparatus examples essentially correspond to the method examples, reference may be made to the description of related parts of the method examples. The apparatus examples described above are merely illustrative, where the units described as separate members may be or not be physically separated, and the members displayed as units may be or not be physical units, i.e., may be located in one place, or may be distributed to a plurality of network units. Some or all of the modules may be selected according to actual needs to achieve the objectives of the implementations of the examples. It can be understood and implemented by those of ordinary skill in the art without any creative effort.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in the process, method, article or device including the element.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

What is claimed is:

1. A method of configuring a transport block (TB) scheduling interval applied to a base station, the method comprising:
   determining a corresponding transport block scheduling interval based on current capability information of current machine type communication (MTC) user equipment (UE), wherein current capability information comprises a parameter indicating a scheduling processing capability level of the current MTC UE, and wherein scheduling of current MTC UE is a single to multiple TB scheduling in which scheduling information of a plurality of physical downline shared channels (PDSCHs) is carried by one physical downlink control channel (PDCCH); and
   sending scheduling information to the current MTC UE through the PDCCH, wherein the scheduling information comprises the corresponding transport block scheduling interval.

2. The method according to claim 1, further comprising:
   receiving capability information reported by the current MTC UE.

3. The method according to claim 2, further comprising:
   receiving updated capability information reported by the current MTC UE after receiving the capability information reported by the current MTC UE.

4. The method according to claim 1, wherein determining the corresponding transport block scheduling interval based on the current capability information of the current MTC UE comprises:
   in response to that the current capability information indicates that the scheduling processing capability level of the current MTC UE is a first level, determining a first time interval as the corresponding transport block scheduling interval; and in response to that the current capability information indicates that the scheduling processing capability level of the current MTC UE is a second level, determining a second time interval as the corresponding transport block scheduling interval;

wherein the first level of the scheduling processing capability is lower than the second level of the scheduling processing capability, and the first time interval is greater than the second time interval.

5. A method of determining a transport block (TB) scheduling interval applied to machine type communication (MTC) user equipment (UE), wherein scheduling of the MTC UE is a single to multiple TB scheduling in which scheduling information of a plurality of physical downlink shared channels (PDSCHs) is carried by one physical downlink control channel (PDCCH), comprising:

receiving scheduling information from a base station through the PDCCH, wherein the scheduling information comprises a transport block scheduling interval corresponding to the MTC UE;

parsing out the transport block scheduling interval from the scheduling information; and receiving data from the PDSCHs of the PDCCH in accordance with the transport block scheduling interval.

6. The method according to claim 5, further comprising:
reporting, by the MTC UE, capability information to the base station, wherein the capability information comprises a parameter indicating a scheduling processing capability level of the MTC UE.

7. The method according to claim 6, further comprising:
reporting, by the MTC UE, updated capability information to the base station after reporting the capability information to the base station.

8. A base station, comprising:
a processor; and
a memory for storing instructions executable by the processor;

wherein the processor is configured to:
determine a corresponding transport block scheduling interval based on current capability information of current machine type communication (MTC) user equipment (UE), wherein current capability information comprises a parameter indicating a scheduling processing capability level of the current MTC UE, and wherein scheduling of current MTC UE is a single to multiple TB scheduling in which scheduling information of a plurality of physical downline shared channels (PDSCHs) is carried by one physical downlink control channel (PDCCH); and send scheduling information to the current MTC UE through the PDCCH, wherein the scheduling information comprises the corresponding transport block scheduling interval.

9. A machine type communication (MTC) user equipment (UE) implementing the method of determining a transport block (TB) scheduling interval according to claim 5, comprising:

a processor; and
a memory for storing instructions executable by the processor; wherein scheduling of the MTC UE is a single to multiple TB scheduling in which scheduling information of a plurality of physical downlink shared channels (PDSCHs) is carried by one physical downlink control channel (PDCCH), wherein the processor is configured to:
receive scheduling information from a base station through the PDCCH, wherein the scheduling information comprises a transport block scheduling interval corresponding to the MTC UE;

parse out the transport block scheduling interval from the scheduling information; and receive data from scheduled the PDSCHs of the PDCCH in accordance with the transport block scheduling interval.

* * * * *